United States Patent
Karpinskyy et al.

(10) Patent No.: US 9,405,510 B2
(45) Date of Patent: Aug. 2, 2016

(54) RANDOM NUMBER GENERATOR

(71) Applicant: SAMSUNG ELECTRONICS CO., LTD., Gyeonggi-do (KR)

(72) Inventors: Bohdan Karpinskyy, Gyeonggi-do (KR); Ihor Vasyltsov, Gyeonggi-do (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 233 days.

(21) Appl. No.: 14/184,925

(22) Filed: Feb. 20, 2014

(65) Prior Publication Data

US 2014/0244702 A1 Aug. 28, 2014

(30) Foreign Application Priority Data

Feb. 25, 2013 (KR) .................. 10-2013-0019822

(51) Int. Cl.
*G06F 7/58* (2006.01)

(52) U.S. Cl.
CPC ..................................... *G06F 7/588* (2013.01)

(58) Field of Classification Search
None
See application file for complete search history.

(56) References Cited

U.S. PATENT DOCUMENTS

| | | | |
|---|---|---|---|
| 6,807,553 B2 | 10/2004 | Oerlemans | |
| 7,124,155 B2 | 10/2006 | Hars | |
| 7,356,551 B2 | 4/2008 | Hars | |
| 7,356,552 B2 | 4/2008 | Hars | |
| 7,702,704 B2 | 4/2010 | Muranaka | |
| 8,150,900 B2 * | 4/2012 | Golic | G06F 7/584 708/250 |
| 8,260,835 B2 | 9/2012 | Fukushima et al. | |
| 8,341,201 B2 | 12/2012 | Vasyltsov et al. | |
| 8,443,022 B2 | 5/2013 | Vasyltsov et al. | |
| 2003/0236802 A1 | 12/2003 | Epstein | |
| 2010/0332574 A1 | 12/2010 | Herbert et al. | |
| 2011/0131263 A1 * | 6/2011 | Vasyltsov | G06F 7/588 708/251 |
| 2011/0302232 A1 * | 12/2011 | Vasyltsov | G06F 7/588 708/251 |
| 2012/0030268 A1 | 2/2012 | Liu et al. | |
| 2014/0244702 A1 * | 8/2014 | Karpinskyy | G06F 7/588 708/251 |
| 2014/0250160 A1 * | 9/2014 | Ihor | H03K 3/84 708/251 |

FOREIGN PATENT DOCUMENTS

| | | |
|---|---|---|
| KR | 1020020021094 | 3/2002 |
| WO | WO2004001583 | 12/2003 |

OTHER PUBLICATIONS

Craig S. Petrie et al., "Modeling and Simulation of Oscillator-Based Random Number Generators", 1996 IEEE, p. 324-327.

* cited by examiner

*Primary Examiner* — David H Malzahn
(74) *Attorney, Agent, or Firm* — F. Chau & Associates, LLC (57) ABSTRACT

A random number generator includes oscillating units configured to generate entropy sources and amplify the generated entropy sources, an entropy source combination unit configured to receive the entropy sources output from the oscillating units and combine the entropy sources to increase entropy, a sampling unit configured to sample a signal output from the entropy source combination unit in response to a sampling clock, and a clock generator and control unit configured to control the oscillating units and generate the sampling clock.

17 Claims, 8 Drawing Sheets

RANDOM NUMBER GENERATOR

CROSS-REFERENCE TO RELATED APPLICATION

This U.S. non-provisional patent application claims priority under 35 U.S.C. §119 to Korean Patent Application No. 10-2013-0019822, filed on Feb. 25, 2013, the disclosure of which is incorporated by reference herein in its entirety.

BACKGROUND

1. Technical Field

The present inventive concept relates to a random number generator.

2. Discussion of the Related Art

With the development of information and communication technology, information coding and decoding techniques are used to keep information secure. A random number is used, for example, as a secret key of a security system. Therefore, a random number generator may be provided in a system for which security is required. In such a system, the random numbers should not have periodicity and regularity. In other words, the generated random numbers should be unpredictable and non-periodic.

A true random number (TRN), which is generated from a physical noise source, is unpredictable and does not have any periodicity. To generate a TRN, a thermal noise or a shot noise is used as a noise source in a random number generator. Alternatively, a clock signal having an irregular period is generated by a ring oscillator for use as the noise source. Meta-stability has good stochastic properties, and thus meta-stability is used in a true random number generator (TRNG). A latch or a flip-flop is typically used to achieve a meta-stabile state.

SUMMARY

Exemplary embodiments of the present inventive concept provide a random number generator for increasing entropy.

An exemplary embodiments of the inventive concept provides a random number generator including oscillating units configured to generate entropy sources and amplify the generated entropy sources, an entropy source combination unit configured to receive the entropy sources output from the oscillating units and combine the entropy sources to increase entropy, a sampling unit configured to sample a signal output from the entropy source combination unit in response to a sampling clock, and a clock generator and control unit configured to control the oscillating units and generate the sampling clock.

In an exemplary embodiment of the inventive concept, at least one of the oscillating units may include a source unit configured to converge to a level of a meta-stability state and generate a noise source in a meta-stability mode, and an amplification unit including a plurality of inverters connected in series to amplify the generated noise source in the meta-stability mode, wherein an output of the amplification unit is connected to the source unit to form a ring oscillator in an oscillation mode.

In an exemplary embodiment of the inventive concept, the source unit may include an inverter, and a switch configured to connect an input of the inverter to an output of the inverter in the meta-stability mode or connect the input of the inverter to the output of the amplification unit in the oscillation mode.

In an exemplary embodiment of the inventive concept, a total number of the inverter of the source unit and the plurality of inverters of the amplification unit may be an odd number.

In an exemplary embodiment of the inventive concept, the entropy source combination unit may increase entropy when a state is changed from '0' to '1'.

In an exemplary embodiment of the inventive concept, the entropy source combination unit may include cross-coupled NAND logic circuits configured to receive entropy sources from at least two of the oscillating units and perform a NAND operation on the received entropy sources.

In an exemplary embodiment of the inventive concept, the random number generator may further include a mod-2 counter configured to receive an output of at least one of the NAND logic circuits and accumulate entropy.

In an exemplary embodiment of the inventive concept, the mod-2 counter may include a flip-flop.

In an exemplary embodiment of the inventive concept, the entropy source combination unit may increase entropy when a state is changed from '1' to '0'.

In an exemplary embodiment of the inventive concept, the entropy source combination unit may include cross-coupled NOR logic circuits configured to receive entropy sources from at least two of the oscillating units and perform a NOR operation on the received entropy sources.

In an exemplary embodiment of the inventive concept, the entropy source combination unit may increase entropy when a state is changed from '0' to '1' or from '1' to '0'.

In an exemplary embodiment of the inventive concept, the entropy source combination unit may include cross-coupled NAND logic circuits configured to receive entropy sources from at least two of the oscillating units and perform a NAND operation on the received entropy sources, cross-coupled NOR logic circuits configured to perform a NOR operation on the received entropy sources, a switch configured to output an output of one of the NAND logic circuits or an output of one of the NOR logic circuits in response to a selection signal, and an AND logic circuit configured to perform an AND operation on the received entropy sources and generate the selection signal.

In an exemplary embodiment of the inventive concept, a random number generator includes first and second oscillating units configured to generate entropy sources in a meta-stability mode and amplify the generated entropy sources in an oscillation mode, an entropy source combination unit configured to receive the entropy sources output from the first and second oscillating units, configure the first and second oscillating units as a ring oscillator in the oscillation mode, and combine the entropy sources to increase entropy, a sampling unit configured to sample a signal output from the second oscillating unit in response to a sampling clock, and a clock generator and control unit configured to generate the sampling clock, and to generate a mode signal for indicating the meta-stability mode or the oscillation mode and a connection signal for configuring the ring oscillator.

In an exemplary embodiment of the inventive concept, the first oscillating unit may include a first inverter, a first multiplexer configured to input an output of the first inverter to the first inverter in response to the mode signal, and a plurality of first inverters configured to receive and amplify the output of the first inverter, and the second oscillating unit may include a second inverter, a second multiplexer configured to input an output of the second inverter to the second inverter in response to the mode signal, and a plurality of second inverters configured to receive and amplify the output of the second inverter.

In an exemplary embodiment of the inventive concept, the entropy source combination unit may include a first connection multiplexer configured to output an output of the first oscillating unit or an output of the second oscillating unit to the first multiplexer in response to the connection signal, a second connection multiplexer configured to output an inverted signal obtained by inverting the output of the first oscillating unit or the output of the second oscillating unit to the second multiplexer in response to the connection signal, a connection inverter configured to output the inverted signal, and a demultiplexer configured to output the output of the first oscillating unit to the first connection multiplexer or the connection inverter in response to the connection signal.

In an exemplary embodiment of the inventive concept, a random number generating includes a first oscillating unit configured to output a first noise source signal in response to a mode signal; a second oscillating unit configured to output a second noise source signal in response to the mode signal; an entropy source combination unit configured to receive the first and second noise source signals and accumulate entropy of the first and second noise source signals, wherein in a first mode the first oscillating unit selects an output of the first oscillating unit as an input to the first oscillating unit, and in a second mode the first oscillating unit selects an output of a first inverter of an inverter chain as the input to the first oscillating unit.

The random number generator may further include a clock generator and control unit configured to generate the mode signal and a sampling clock; and a sampling unit configured to receive an output of the entropy source combination unit and the sampling clock.

The first oscillating unit may include a meta-oscillator.

The first oscillating unit may be configured as a ring oscillator in the first mode.

The entropy may be accumulated by the entropy source combination unit when the first and second noise source signals are different from each other.

BRIEF DESCRIPTION OF THE DRAWINGS

The above and other features of the inventive concept will become more apparent by describing in detail exemplary embodiments thereof with reference to the attached drawings, in which.

DETAILED DESCRIPTION OF THE EMBODIMENTS

Hereinafter, exemplary embodiments of the inventive concept will be described below in more detail with reference to the accompanying drawings. The inventive concept may, however, be embodied in different forms and should not be construed as limited to the embodiments set forth herein.

A random number generator according to an exemplary embodiment of the inventive concept may reduce a negative effect due to CMOS transistor mismatch generated in a training operation based on meta-stability.

Figure 1:
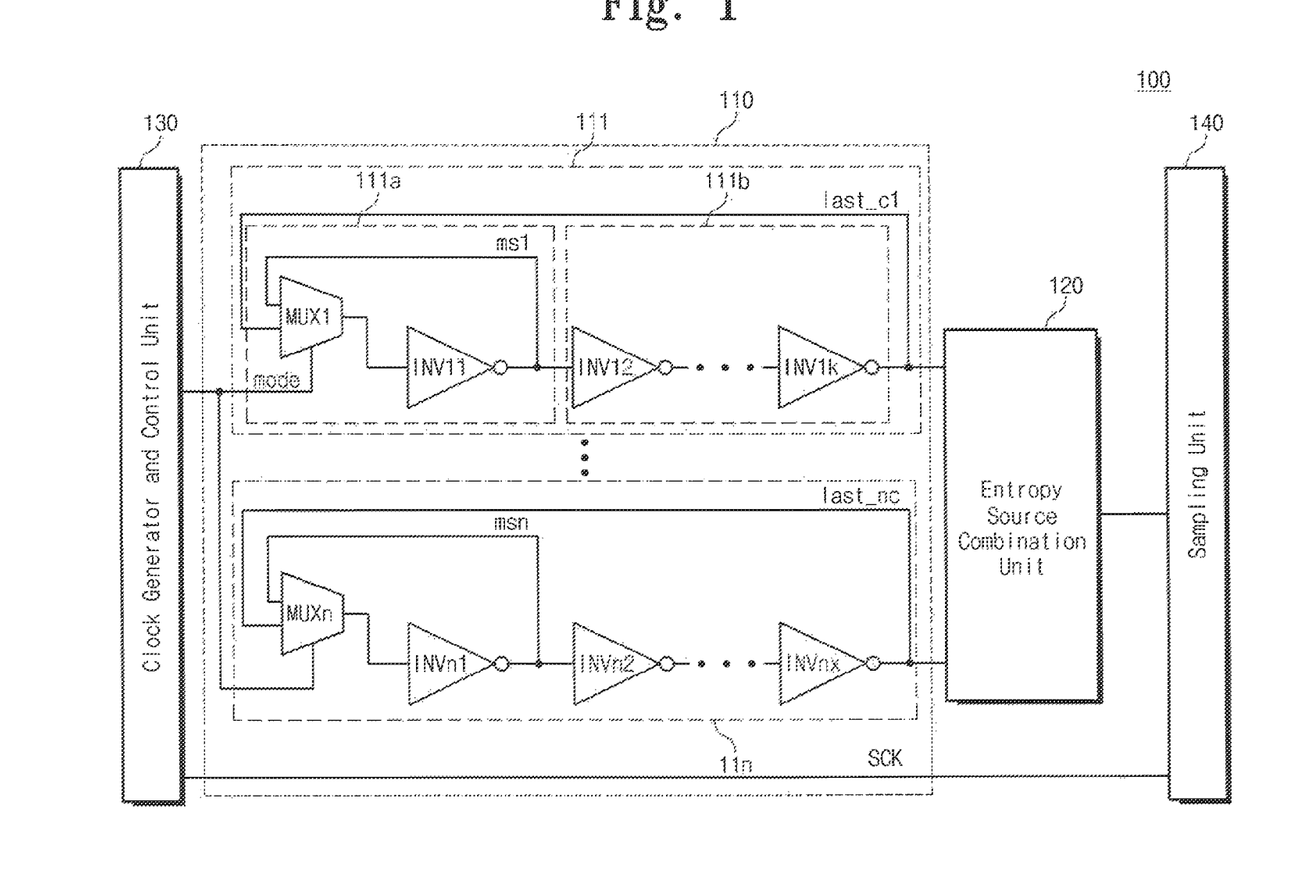
FIG. 1 is a diagram illustrating a random number generator according to an exemplary embodiment of the inventive concept.

FIG. 1 is a diagram illustrating a random number generator according to an exemplary embodiment of the inventive concept. Referring to FIG. 1, a random number generator 100 includes an oscillator 110, an entropy source combination unit 120, a clock generator and control unit 130, and a sampling unit 140.

The oscillator 110 includes a plurality of oscillating units 111 to 11$n$ (n is an integer not less than 2). Each of the oscillating units 111 to 11$n$ includes an entropy source unit 111$a$ and an amplification chain unit 111$b$. Each of the plurality of oscillating units 111 to 11$n$ of the oscillator 110 may operate in a meta-stability mode or an oscillation mode in response to a mode signal MODE. The sampling unit receives a sampling clock SCK from the clock generator and control unit 130 and samples input signals in response thereto.

In an exemplary embodiment of the inventive concept, each of the oscillating units 111 to 11$n$ may be implemented with a meta-oscillator.

An operation in the meta-stability mode is described as follows. In the oscillating units 111 to 11$n$, inverters INV11 to INVn1 may be fixed by switching devices MUX1 to MUXn to converge to a meta-stability level in the meta-stability mode. Therefore, entropy sources that statistically provide analog signals may be generated. Outputs of the inverters INV11 to INVn1 may be connected to chains of remaining inverters in the respective oscillation units to form corresponding amplification chains (for example, inverters INV11 to INV1$k$ form a first amplification channel and inverters INVn1 to INVnx form an nth amplification channel). Here, the numbers x, k and n of the inverters may be dependent on a gain value of an inverter aimed at sufficiently amplifying a statistical analog signal. Outputs of first inverters of the chains (e.g., INV11 to INVn1) may be routed back to the switching devices MUX1 to MUXn as identified by ms1 to msn. The oscillating units 111 to 11$n$ output noise source signals last_c1 to last_nc.

An operation in the oscillation mode is described as follows. To form a ring oscillator, the switches MUX1 to MUXn are substituted. In other words, the outputs of the amplification units are routed back to the switches. The ring oscillator may be implemented with the following inverters: MUX1→INV11→INV12→ . . . →INV1$k$ and MUXn1→INVn1→INVn2→ . . . →INVnx. The number of inverters forming the ring oscillator is an odd number. After the substitution, the ring oscillator may generate an oscillating signal.

An initial phase shift value of the oscillating signal may be determined from momentum values of signals output from inverters constituting a meta-ring oscillator before the oscillation mode. The momentum values of the output signals may be generated from statistical analog signals. The momentum values may inherit randomness and include entropy. In addition, the random number generator 100 may continue to operate in the oscillation mode, and may additionally accumulate jitter.

The entropy source combination unit 120 may accumulate as much entropy as possible from all possible or combined entropy sources, and may output the accumulated entropy to the sampling unit 140. The entropy source combination unit 120 may be enabled during one or both of the meta-stability mode and the oscillation mode, or during one of the modes and a part of the other mode, or just during a part of one of the modes. Further, a type and extensibility of a selected combination mechanism may be related to an amount of combined noise sources.

Since the random number generator 100 according to an exemplary embodiment of the inventive concept is provided with the oscillator 110 for generating a plurality of entropy sources and the entropy source combination unit 120 for combining the plurality of generated entropy sources, the random number generator 100 may increase entropy when generating random numbers.

Hereinafter, it will be described how entropy is increased on the assumption that, for convenience, the number of the oscillating units of the oscillator 110 is two. However, the number of oscillating units is not limited thereto and may be less than or greater than two.

Figure 2:
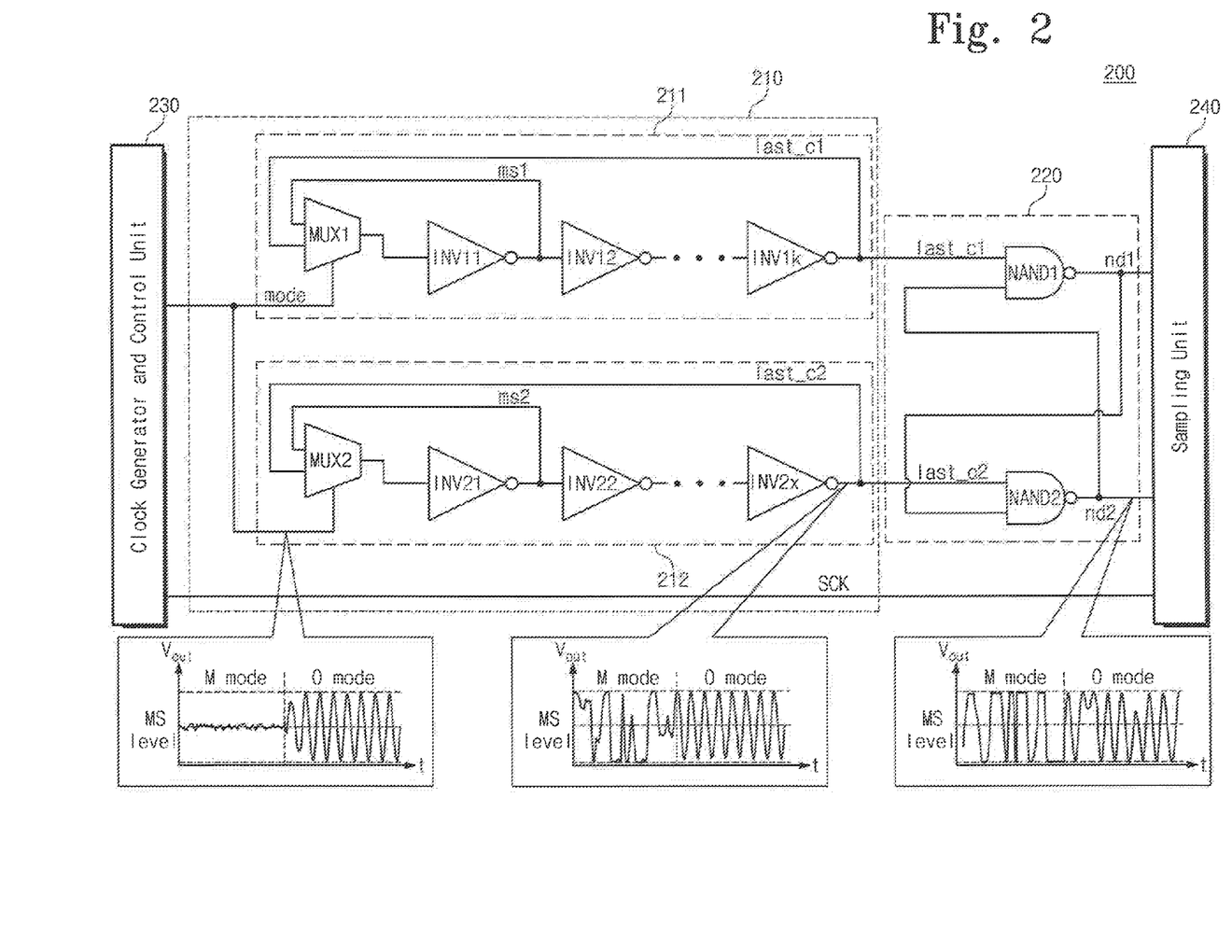
FIG. 2 is a diagram illustrating a random number generator having an oscillator with two oscillating units according to an exemplary embodiment of the inventive concept.

FIG. 2 is a diagram illustrating a random number generator having an oscillator with two oscillating units according to an exemplary embodiment of the inventive concept. Referring to FIG. 2, a random number generator 200 includes a first oscillating unit 211, a second oscillating unit 212, an entropy source combination unit 220, a clock generator and control unit 230, and a sampling unit 240. The first oscillating unit 211 and the second oscillating unit 212 are part of oscillator 210.

The first oscillating unit 211 outputs a first noise source last_c1, and the second oscillating unit 212 outputs a second noise source last_c2.

The entropy source combination unit 220 includes cross-coupled NAND gates NAND1 and NAND2. The cross-coupled NAND gates NAND1 and NAND2 may receive the first noise source last_c1 and the second noise source last_c2 to output first and second operation values nd1 and nd2. An operation of the entropy source combination unit 220 is described in the table below.

TABLE 1

| last_c1 | last_c2 | nd1 | nd2 | entropy |
|---|---|---|---|---|
| 0 | 1 | 1 | 0 | Accumulated from phase difference |
| 1 | 0 | 0 | 1 | Accumulated from phase difference |
| 1 → 0 | 1 → 0 | C | C | No entropy, because previous value is stored |
| 0 → 1 | 0 → 1 | R | R | Accumulated from signal matching |

When both of the input signals last_c1 and last_c2 are changed from '1' to '0', as shown in the third column of Table 1, a previous value is stored. Thus, entropy is not accumulated.

When the input signals last_c1 and last_c2 are different from each other, e.g., inverse to each other, as shown in the first and second columns of Table 1, the second output signal nd2 may be inverse to the first output signal nd1 (or vice versa), and the entropy may be accumulated from a phase difference between the input signals last_c1 and last_c2.

When the input signals last_c1 and last_c2 are changed from '0' to '1', as shown in the fourth column of Table 1, a state may not be known. In this case, the entropy may be accumulated from signals matched after a partial transition process.

In the case where a bistable latch is used as the entropy source combination unit 220, the entropy source combination unit 220 may generate additional entropy when the input signals last_c1 and last_c2 are changed from '0' to '1'.

FIG. 2 further shows voltage-time graphs of the mode signal, input signal last_c2 and second operating value nd2 in meta-stability mode M or oscillation mode O.

Figure 3:
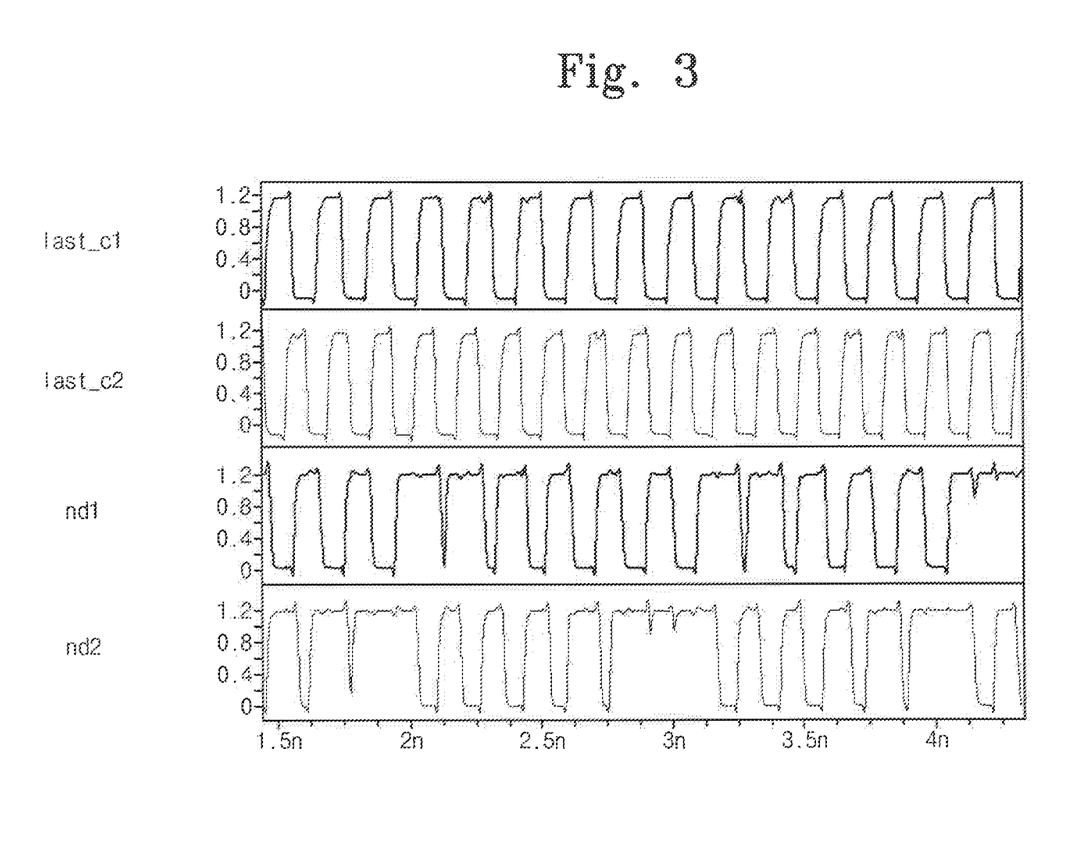
FIG. 3 is a graph illustrating a simulation result of the random number generator illustrated in FIG. 2, according to an exemplary embodiment of the inventive concept.

FIG. 3 is a graph illustrating a simulation result of the random number generator 200 illustrated in FIG. 2, according to an exemplary embodiment of the inventive concept. Referring to FIG. 3, a state becomes unknown when the signals are changed from '0' to '1'. In other words, when the two oscillating signals last_c1 and last_c2 are input to the cross-coupled NANDs, at least one initial entropy may increase. A state in a cross-coupled NAND part may be undetermined. Here, the output signals nd1 and nd2 may be dependent on unique thermal noise. In FIG. 3, the values on the y-axis correspond to voltage and the values on the x-axis correspond to nanoseconds.

Figure 4:
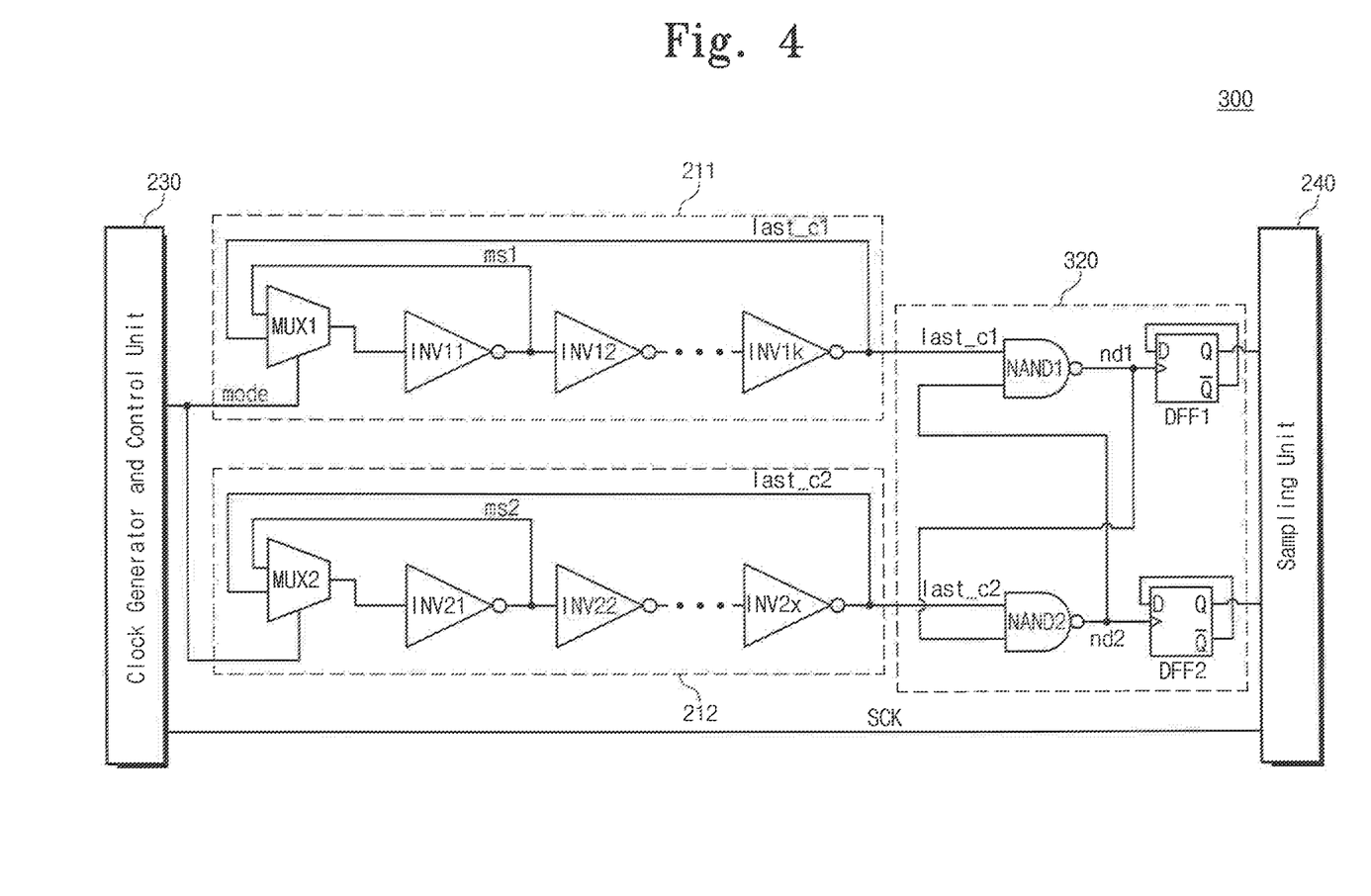
FIG. 4 is a diagram illustrating a random number generator having an oscillator with two oscillating units according to an exemplary embodiment of the inventive concept.

FIG. 4 is a diagram illustrating a random number generator having an oscillator with two oscillating units according to an exemplary embodiment of the inventive concept. Referring to FIG. 4, a random number generator 300 may be the same as the random number generator 200 of FIG. 2 except for an entropy source combination unit 320 including flip-flops DFF1 and DFF2. The flip-flops DFF1 and DFF2 are mod-2 counters and are connected to outputs of the NANDs NAND1 and NAND2.

In this case, outputs of the flip-flops DFF1 and DFF2 are changed when a rising signal is detected in response to an input clock. Here, the input clock may be dependent on entropy collected from the meta-oscillator and additional entropy collected by the cross-coupled NANDs when an input signal is switched without being determined.

The entropy source combination unit 320 illustrated in FIG. 4 has a NAND-based bistable latch structure. However, an exemplary embodiment of the inventive concept is not limited thereto. The entropy source combination unit may have a NOR-based bistable latch structure.

Figure 5:
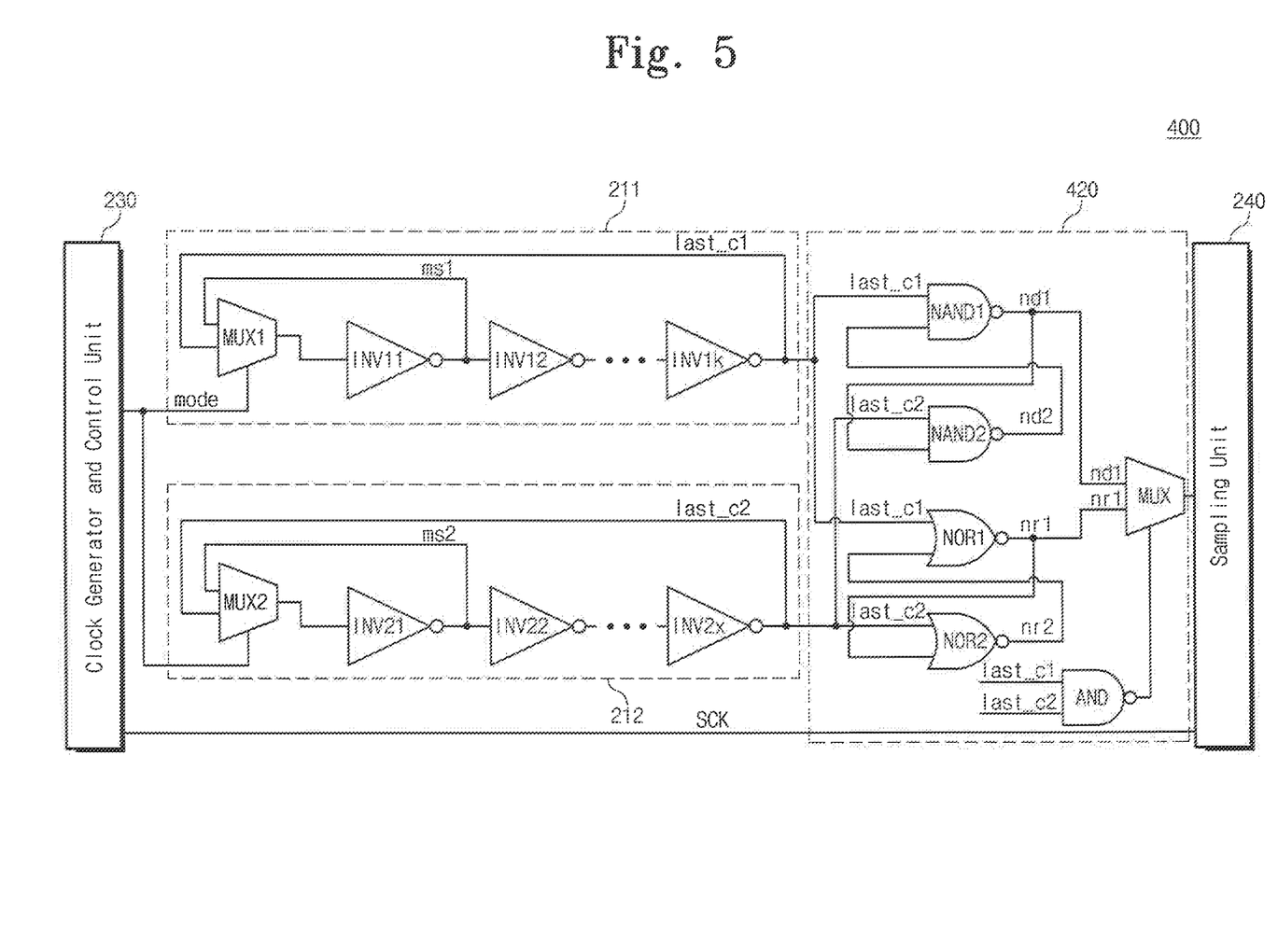
FIG. 5 is a diagram illustrating a random number generator having an oscillator with two oscillating units according to an exemplary embodiment of the inventive concept.

FIG. 5 is a diagram illustrating a random number generator having an oscillator with two oscillating units according to an exemplary embodiment of the inventive concept. Referring to FIG. 5, a random number generator 400 may be the same as the random number generator 200 of FIG. 2 except for an entropy source combination unit 420 including NOR-based bistable latches NOR1 and NOR2.

The NAND-based bistable latches NAND1 and NAND2 generate entropy when the input signals last_c1 and last_c2 are the same or are changed from '0' to '1', but do not generate entropy when the input signals last_c1 and last_c2 are changed from '1' to '0'. However, the NOR-based bistable latches NOR1 and NOR2 generate entropy when the input signals last_c1 and last_c2 are changed from '1' to '0'.

The entropy source combination unit 420 includes a switching device MUX which may select one of an output from the NAND-based bistable latches NAND1 and NAND2 (e.g., nd1) and an output from the NOR-based bistable latches NOR1 and NOR2 (e.g., nr1) according to a combination of the input values last_c1 and last_c2 provided to an AND gate. Output of NOR2 (e.g., nr2) is provided as input to NOR1 and output of NAND2 (e.g., nd2) is provided as input to NAND1.

Figure 6:
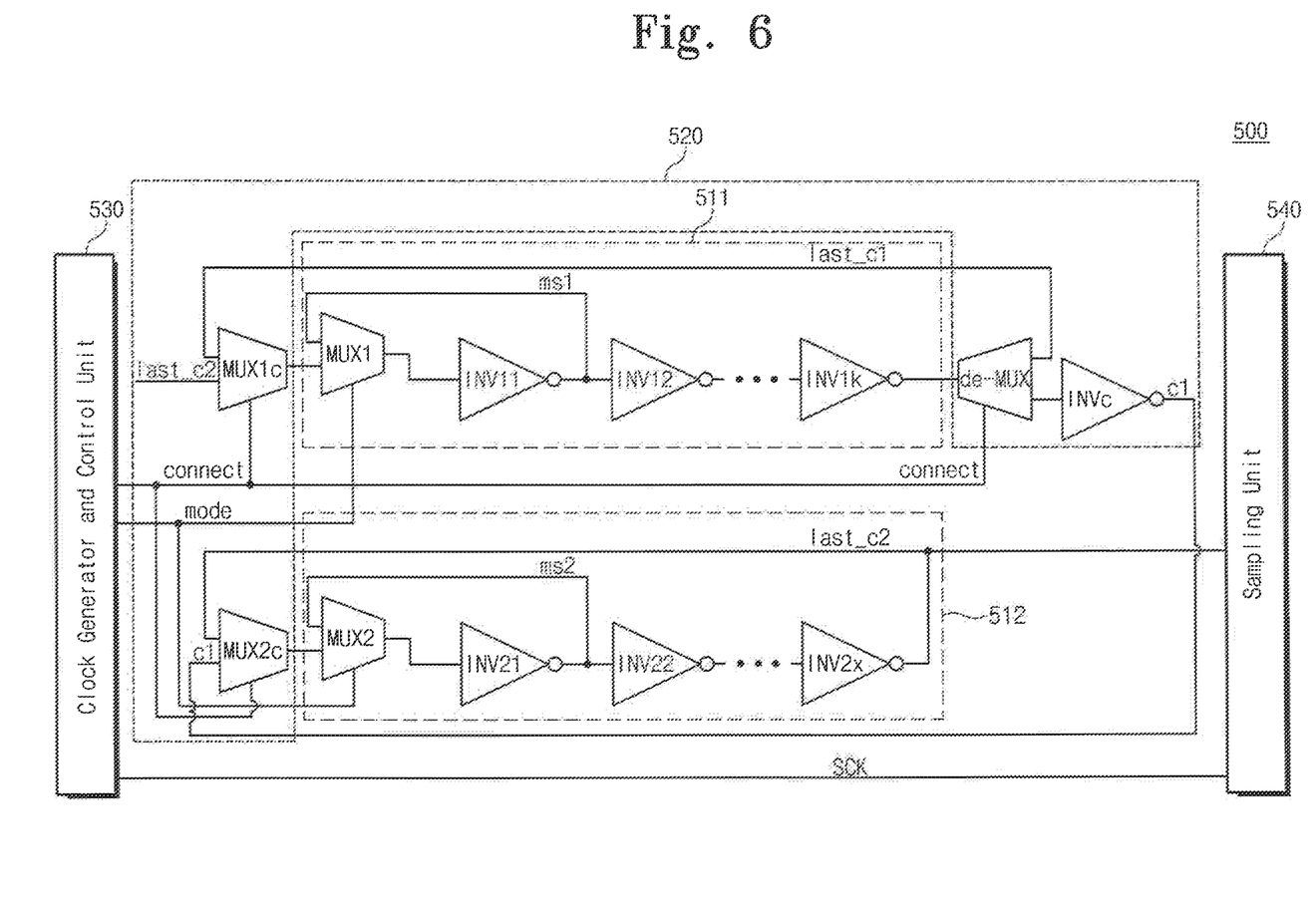
FIG. 6 is a diagram illustrating a random number generator according to an exemplary embodiment of the inventive concept.

FIG. 6 is a diagram illustrating a random number generator according to an exemplary embodiment of the inventive concept. Referring to FIG. 6, in a random number generator 500, two meta-oscillators 511 and 512 may be implemented as one ring oscillator by an entropy source combination unit 520. The random number generator 500 further includes a clock generator and control unit 530, and a sampling unit 540. The entropy source combination unit 520 includes a multiplexer MUX1c having its output provided to a multiplexer MUX1 of the meta-oscillator 511. The entropy source combination unit 520 includes a multiplexer MUX2c having its output provided to a multiplexer MUX2 of the meta-oscillator 512. The structure of each of the meta-oscillators 511 and 512 is the same as that of the oscillating units 211 and 212 of FIG. 2. As further shown in FIG. 6, the output of the meta-oscillator 511 is provided to a de-multiplexer de-MUX and the de-multiplexer de-MUX receives a connection signal CONNECT, routes one output (e.g., last_c1) to the multiplexer MUX1c and routes another output to an inverter INVc. The output of the inverter INVc is provided as input last_c1 to the multiplexer MUX2c. Multiplexers MUX1c and MUX2c each receive last_c2 as input. And further, last_c2 is provided to the sampling unit 540 as input.

Figure 7:
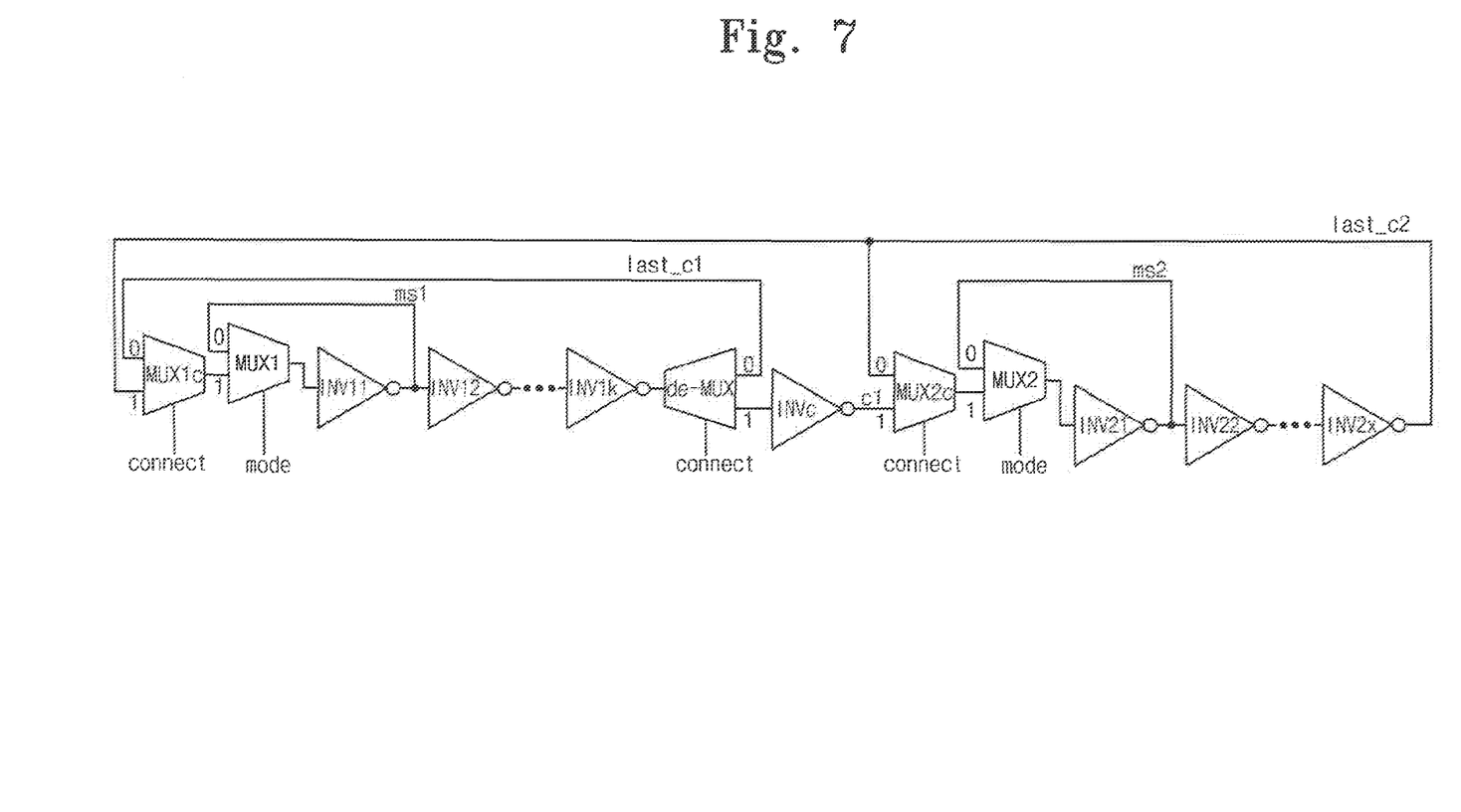
FIG. 7 is a diagram illustrating the random number generator of FIG. 6 implemented with one oscillator, according to an exemplary embodiment of the inventive concept.

FIG. 7 is a diagram illustrating the random number generator 500 of FIG. 6 implemented with one ring oscillator, according to an exemplary embodiment of the inventive concept.

An operation of the random number generator 500 is described as follows. When both the connection signal CONNECT and a mode signal MODE are '0', both of the meta-oscillators 511 and 512 are disconnected, and entropy is accumulated in an entropy mode. Next, when the mode signal MODE is changed from '0' to '1', the meta oscillators 511 and 512 are switched from the meta-stability mode to the oscillation mode. In this case, previously collected entropy may affect initial phases of the oscillators 511 and 512. Additional entropy due to jitter may be collected in the oscillation mode of the meta-oscillators 511 and 512. To combine all entropy of the meta-oscillators 511 and 512, the two meta-oscillators 511 and 512 form one ring oscillator in which a difference therebetween in the oscillation mode becomes an entropy source. Thereafter, entropy may be sampled.

In this manner, as illustrated in FIGS. 6 and 7, the meta-oscillators 511 and 512 are combined, and the number of inverters may be an odd number in a last ring.

Although it is illustrated that inverters in the meta-oscillators 511 and 512 are digital cell inverters, other inverting elements (e.g. NAND, NOR, and XNOR) may be used.

Figure 8:
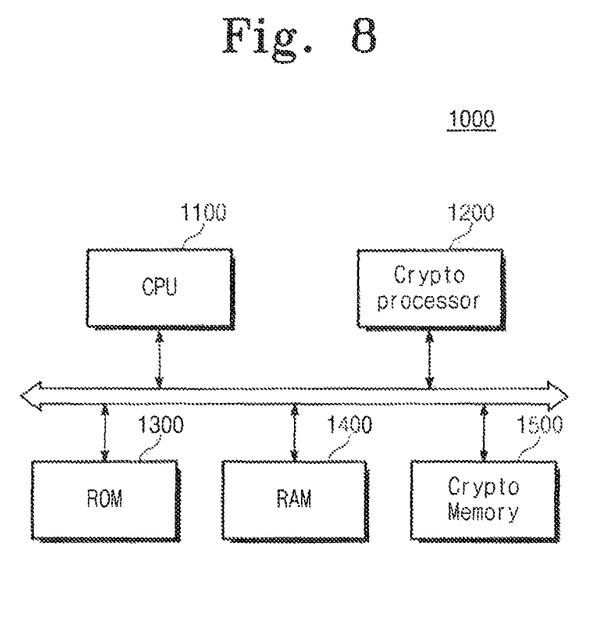
FIG. 8 is a block diagram illustrating a security system including a crypto-processor having a random number generator according to an exemplary embodiment of the inventive concept.

FIG. 8 is a block diagram illustrating a security system 1000 including a crypto-processor having a random number generator according to an exemplary embodiment of the inventive concept. Referring to FIG. 8, the security system 1000 includes a central processing unit (CPU) 1100, a crypto-processor 1200, a read only memory (ROM) 1300, a random access memory (RAM) 1400, and a crypto-memory 1500. The CPU 1100 controls an overall operation of the security system 1000. The crypto-processor 1200 is controlled by the CPU 1100 to interpret commands for enabling encryption, authentication, and an electronic signature and process data. The crypto-processor 1200 may include one of the random number generators described above with reference to FIGS. 1 to 7. The ROM 1300 and the RAM 1400 store data for driving the security system 1000. The crypto-memory 1500 stores data for driving the crypto processor 1200.

As described above, a random number generator according to an exemplary embodiment of the inventive concept is provided with an entropy source combination unit for combining entropy sources output from a plurality of oscillating units, and thus entropy can be increased when random numbers are generated.

While the inventive concept has been shown and described with reference to exemplary embodiments thereof, it will be apparent to those of ordinary skill in the art that various changes in form and detail may be made thereto without departing from the spirit and scope of the inventive concept as defined by the claims.

What is claimed is:

1. A random number generator, comprising:
oscillating units configured to generate entropy sources, amplify the generated entropy sources, and output the amplified entropy sources;
an entropy source combination unit configured to receive the entropy sources output from the oscillating units and combine the entropy sources to increase entropy;
a sampling unit configured to sample a signal output from the entropy source combination unit in response to a sampling clock; and
a clock generator and control unit configured to control the oscillating units and generate the sampling clock,
wherein at least one of the oscillating units comprises:
a source unit configured to converge to a level of a meta-stability state and generate a noise source in a meta-stability mode; and
an amplification unit comprising a plurality of inverters connected in series to amplify the generated noise source in the meta-stability mode,
wherein an output of the amplification unit is connected to the source unit to form a ring oscillator in an oscillation mode.

2. The random number generator of claim 1, wherein the source unit comprises:
an inverter; and
a switch configured to connect an input of the inverter to an output of the inverter in the meta-stability mode or the input of the inverter to the output of the amplification unit in the oscillation mode.

3. The random number generator of claim 2, wherein a total number of the inverter of the source unit and the plurality of inverters of the amplification unit is an odd number.

4. The random number generator of claim 1, wherein the entropy source combination unit increases entropy when the entropy sources are changed from '0' to '1'.

5. The random number generator of claim 4, wherein the entropy source combination unit comprises cross-coupled NAND logic circuits configured to receive entropy sources from at least two of the oscillating units and perform a NAND operation on the received entropy sources.

6. The random number generator of claim 5, further comprising a mod-2 counter configured to receive an output of at least one of the NAND logic circuits and accumulate entropy.

7. The random number generator of claim 6, wherein the mod-2 counter comprises a flip-flop.

8. The random number generator of claim 1, wherein the entropy source combination unit increases entropy when the entropy sources are changed from '2' to '0'.

9. The random number generator of claim 8, wherein the entropy source combination unit comprises cross-coupled NOR logic circuits configured to receive entropy sources from at least two of the oscillating units and perform a NOR operation on the received entropy sources.

10. The random number generator of claim 1, wherein the entropy source combination unit increases entropy when the entropy sources are changed from '0' to '1' or from '1' to '0'.

11. The random number generator of claim 10, wherein the entropy source combination unit comprises:
   cross-coupled NAND logic circuits configured to receive entropy sources from at least two of the oscillating units and perform a NAND operation on the received entropy sources;
   cross-coupled NOR logic circuits configured to perform a NOR operation on the received entropy sources;
   a switch configured to output an output of one of the NAND logic circuits or an output of one of the NOR logic circuits in response to a selection signal; and
   an AND logic circuit configured to perform an AND operation on the received entropy sources and generate the selection signal.

12. A random number generator, comprising:
   first and second oscillating units configured to generate entropy sources in a meta stability mode, amplify the generated entropy sources in an oscillation mode, and output the amplified entropy sources;
   an entropy source combination unit configured to receive the entropy sources output from the first and second oscillating units, configure the first and second oscillating units as a ring oscillator in the oscillation mode, and combine the entropy sources to increase entropy;
   a sampling unit configured to sample a signal output from the second oscillating unit in response to a sampling clock; and
   a clock generator and control unit configured to generate the sampling clock, and to generate a mode signal for indicating the meta-stability mode or the oscillation mode and a connection signal for configuring the ring oscillator,
   wherein the first oscillating unit comprises:
   a first inverter;
   a first multiplexer configured to input an output of the first inverter to the first inverter in response to the mode signal; and
   a plurality of first inverters configured to receive and amplify the output of the first inverter, and
   the second oscillating unit comprises:
   a second inverter;
   a second multiplexer configured to input an output of the second inverter to the second inverter in response to the mode signal; and
   a plurality of second inverters configured to receive and amplify the output of the second inverter,
   wherein the entropy source combination unit comprises:
   a first connection multiplexer configured to output an output of the first oscillating unit or an output of the second oscillating unit to the first multiplexer in response to the connection signal;
   a second connection multiplexer configured to output an inverted signal obtained by inverting the output of the first oscillating unit or the output of the second oscillating unit to the second multiplexer in response to the connection signal;
   a connection inverter configured to output the inverted signal; and
   a demultiplexer configured to output the output of the first oscillating unit to the first connection multiplexer or the connection inverter in response to the connection signal.

13. A random number generator, comprising:
   a first oscillating unit configured to output a first noise source signal in response to a mode signal;
   a second oscillating unit configured to output a second noise source signal in response to the mode signal;
   an entropy source combination unit configured to receive the first and second noise source signals from the first and second oscillating units and accumulate entropy of the first and second noise source signals,
   wherein in a first mode the first oscillating unit selects an output of the first oscillating unit as an input to the first oscillating unit, and in a second mode the first oscillating unit selects an output of a first inverter of an inverter chain as the input to the first oscillating unit, wherein the inverter chain is connected to an output terminal of the first oscillating unit.

14. The random number generator of claim 13, further comprising:
   a clock generator and control unit configured to generate the mode signal and a sampling clock; and
   a sampling unit configured to receive an output of the entropy source combination unit and the sampling clock.

15. The random number generator of claim 13, wherein the first oscillating unit includes a meta-oscillator.

16. The random number generator of claim 13, wherein the first oscillating unit is configured as a ring oscillator in the first mode.

17. The random number generator of claim 13, wherein the entropy is accumulated by the entropy source combination unit when the first and second noise source signals are different from each other.

* * * * *